Figure 1:
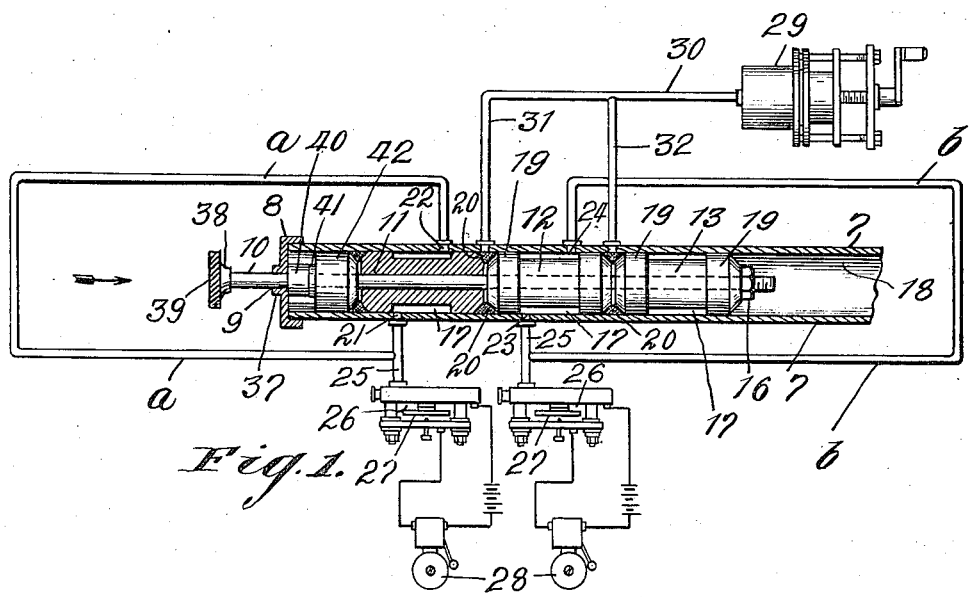

J. W. WHITE.
TESTING DEVICE.
APPLICATION FILED MAY 8, 1913.

1,137,821.

Patented May 4, 1915.

UNITED STATES PATENT OFFICE.

JOHN W. WHITE, OF NEW YORK, N. Y., ASSIGNOR TO AERO FIRE ALARM COMPANY, OF NEW YORK, N. Y., A CORPORATION OF NEW JERSEY.

TESTING DEVICE.

1,137,821.　　　　　Specification of Letters Patent.　　Patented May 4, 1915.

Application filed May 8, 1913. Serial No. 766,271.

*To all whom it may concern:*

Be it known that I, JOHN W. WHITE, a subject of the King of Great Britain and Ireland, residing at New York, in the county and State of New York, have invented certain new and useful Improvements in Testing Devices, of which the following is a full, clear, and exact description.

This invention relates to improvements in testing devices for determining the operability and efficiency of fluid systems in general, wherein piping or tubing is employed, the term fluid as herein used being understood to cover air, gases and liquids and its meaning is to be so interpreted throughout the specification and claims.

While I would have it understood that my invention is applicable to fluid systems for various purposes, it is particularly adaptable to use in conjunction with the so-called pneumatic signal systems, wherein the expansion of air within the piping or tubing forming part of such systems serves to operate suitable mechanism to close or make an electric circuit and set the signaling means in operation, and, in order that my invention may be clearly understood, I have elected to illustrate and describe the same in connection with such a pneumatic signaling system, though, as before stated, I do not desire to limit myself to this specific application of my invention.

In systems of the character described, it is essential that means be provided for making periodical tests of the apparatus, to ascertain whether it is in serviceable condition and to this end I have devised a testing device, whereby I am enabled to produce an abnormal pressure of atmosphere within the tubing and thereby bring about a condition approximating such conditions as those under which it is normally designed to operate and which will enable me to accurately determine the efficiency and positiveness of operation of the signal apparatus.

The object of the present invention is to provide a testing device to be used in the aforesaid connection, which will be simple in construction while at the same time being positive in operation, and which, by reason of its simplicity of structure and operation, may be readily installed in existing systems or be produced as a part of new systems at little cost.

Another object of my invention is to provide a testing device, which is particularly adaptable for use in pneumatic signal systems where the tubing or piping traverses a large area and where it is, therefore, desirable, and in fact, essential to have more than one means of communication between the piping or tubing and the mechanism whereby the signal is rendered operative, so that the air, when expanded within the tubing may reach and influence the signal operating mechanism in the shortest possible time.

My invention further contemplates the provision of a testing device whereby a single operation will enable the operator or tester to bring the means for increasing the pressure within the tubing simultaneously into circuit with a plurality of normally independent circuits, so that a test may be expeditiously made of a complete signal system which will be thrown out of service only during the testing period, requiring but a very small fraction of time.

I shall now proceed to describe my invention with reference to the accompanying drawings and then point out with more particularity the essential elements of novelty therein, in the appended claims.

Figure 2:
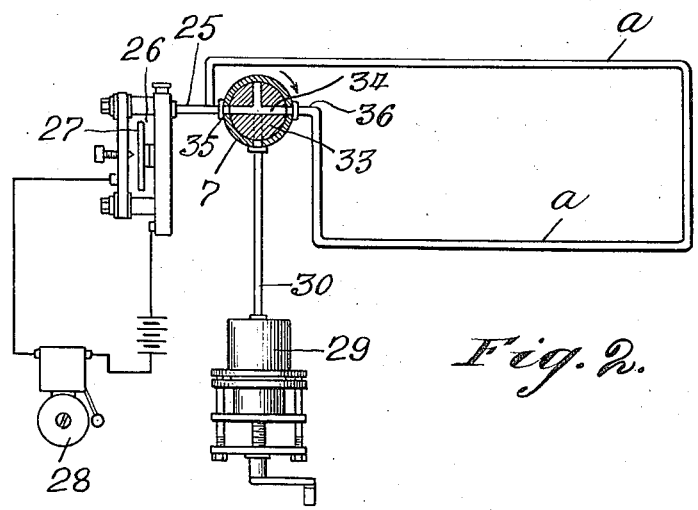

In the drawings: Figure 1 is a diagrammatic view, partly in section, of my preferred structure showing its employment in connection with a pneumatic signal system having two circuits, and, Fig. 2 is a similar view showing a modified form of valve which I may employ in carrying my invention into effect.

Referring now to the drawings in detail, in which like characters of reference are employed to designate similar parts in both views, 7 is a tube or pipe, which is preferably closed at one end by a cap 8, as shown, having an aperture 9 forming a bearing for the rod 10 which is slidable therewithin. This tube 7 forms the casing of my testing device, and it may be of any suitable dimensions and located at any point in the signal system, but I have found it desirable to arrange it in proximity to the signal operating mechanism, in order that when the circuits are being tested by my device, the nism.

On the rod 10 as will be apparent from Fig. 1, I mount the valves 11, 12 and 13, the number of valves and the consequent length of the rod 10 and the casing 7 being dependent upon the number of circuits in the system in conjunction with which my invention is used. These valves are preferably of the configuration shown, having a contracted central portion as shown, so that when the valves are mounted on the rod 10 and rigidly secured thereto by means of the securing nut 16 threaded thereon, a passage 17 will be provided between the inner wall 18 of the piping or casing 7 and the contracted portion of each valve, the enlarged ends or heads 19 of each valve being approximately of the same diameter as the interior of the tube or casing 7. In mounting the valves on the rod 10, I position between the opposed heads of each valve an annular packing ring 20, as shown, the object of which will be readily apparent. In the present illustration of my invention, wherein I have shown the same in connection with a pneumatic system containing but two circuits, it will be observed that each circuit communicates with the tube or casing 7 at 21 and 22; and 23 and 24 respectively, so that under normal conditions, in the event of an abnormal increase of temperature of the air within the circuit $a$ occurring, if the point at which the element influencing the increase occurs is nearer to the connection 22, the air will flow through the pipe into the tube or casing 7 and around the valve 11 through the pipe 25 into the expansion chamber 26, which will operate the diaphragm 27 establishing an electrical circuit and operating the alarm 28. On the other hand, if the raising of temperature is influenced at a point closer to the connection 25, the air will not be forced to travel about the entire circuit and pass through the tube or casing 7, but will flow directly through said connection 25 and actuate the signal operating mechanism. It will, of course, be understood that the circuit $b$ will operate in a like manner under similar conditions as will each and every circuit in the system of which my invention is a part.

It is frequently necessary and desirable that pneumatic or other systems for signaling or the like, be tested at regular intervals to determine whether they are efficient in operation so that they may be depended upon in an emergency. Therefore, in connection with the valves 11, 12 and 13, and the method of mounting and operating the same, I employ a rotary or other suitable pump 29 which I preferably locate at a point in the system in proximity to the valve mechanism and which has means of communication with the interior of the pipe or casing 7 through a supply pipe 30 leading from the pump 29 and the connecting pipes 31 and 32 leading therefrom for each circuit. When it is desired to test the system of which my invention is a part, the valves are moved in the direction of the arrow (Fig. 1) by means of the rod 10, this movement of the valves effecting the closing of the openings 21, and 23 of the connecting pipes 25 of the circuits $a$ and $b$, and the opening of the connecting pipes 31 and 32 leading from the pipe 30 connected to the pump 29, whereby communication is established between said latter connecting pipes 31 and 32 and the pipes 22 and 24 of the circuits $a$ and $b$, the connecting pipes 31 and 32 leading from the pump supply pipe being normally closed by the packing rings 20. When communication has been established for testing in the manner heretofore described, the pump 29 is operated and a condition obtained within the tubing which approximates that which would result under an emergency such as that for which pneumatic signal systems are designed. The compressed air from the pump 29 will produce an abnormal pressure within the pipe 30 and connections 31 and 32, increasing the pressure within the casing 7 and about the respective valves, and within the pipes 22 and 24 of the respective circuits $a$ and $b$, thereby influencing the signal actuating mechanism and setting the signaling means in operation in the customary manner. By this method, it will be manifest that a single operation of the valve actuating rod 10 will render it possible to simultaneously test the entire line of piping in each circuit in connection with which my invention is used, the closing of the connecting pipes 21 and 23 and the operation of the pump 29 producing an abnormal pressure throughout the entire length of the piping in each circuit.

To limit the movement of the valves 11, 12 and 13 so that they will be properly positioned to close the openings 21 and 23 and establish communication between the pipes 22 and 31 and 24 and 32, I have found it desirable to provide suitable stops. In the embodiment of my invention shown in Fig. 1, these stops take the form of a boss 37 formed on the cap 8 against which the shoulder 38 on the operating handle 39 of the rod 10 abuts when the rod is moved in the direction of the arrow. When the rod 10 is moved in the reverse direction to re-open the normal circuit and close the pipes 31 and 32, the movement of the rod is limited by the bushing 40 carried by the rod 10, which abuts against the inside of the cap 8 at one end, the other end thereof bearing against the shoulder 41 formed on the packing retaining member 42. This packing retaining member 42 may be of any suitable construction, but I have found it expedient to employ a head such as those forming part of valves 11, 12 and 13.

In the modification shown in Fig. 2, the method of operation of which is similar to that above described with the exception of the slide valves, I employ a three-way valve 33 which is rotated in the direction of the arrow, the valve as shown being in its normal position. For testing purposes, the valve will be rotated to bring the passage 34 in alinement with the pipe 30 leading from the pump 29 and close the port 35 so that when the pump is operated the air pressure will increase within the connecting pipe 30 and the pipe 36 of the circuit *a*, whereby, as in the preferred form of my invention the entire line of piping forming part of the system will be tested.

While I have illustrated and described my invention with reference to the accompanying drawings, it is obvious that the details of structure may be variously modified or changed without departing from the spirit and scope of my invention.

Having thus described my invention what I claim as new and desire to secure by Letters Patent is:

1. The combination with a fluid system, comprising a plurality of independent circuits, of means for simultaneously testing all of said circuits, said means comprising a casing connected to and forming a part of each circuit, a pump connected to said casing and a plurality of valves mounted within said casing and operable by a single movement in one direction to simultaneously establish communication between said pump and each of said circuits and in the reverse direction to reestablish the normal circuits through said casing.

2. The combination with a fluid system, comprising a plurality of independent circuits, of means for simultaneously testing all of said circuits, said means comprising an enlarged conduit common to all of said circuits and forming a part thereof, a pump having means of communication with said conduit and a plurality of valves positioned within said conduit and operable by a single movement in one direction to establish communication between said pump and each of said circuits, and by a single movement in the reverse direction to reestablish said independent circuits through said conduit.

3. A means for simultaneously testing a plurality of independent circuits of a fluid system, consisting of a conduit common to all of said circuits, each circuit having two points of connection with said conduit and being independent of the remaining circuits, a pump communicating with said conduit and valve mechanism operable within said conduit by a single movement in one direction to establish communiaction between said pump and said circuits and in the reverse direction to cut out said pump and reestablish said normal independent circuits.

4. The combination with a fluid system, comprising a plurality of independent circuits, of means for simultaneously testing all of said circuits, said means comprising a conduit having communication with all of said circuits and forming a part thereof, a pump normally independent of said circuits and connected with said conduit, a plurality of valves mounted within said conduit and manually operable by a single movement in one direction to establish communication between said pump and each of said circuits, and means for operating said pump to simultaneously test each of said circuits through said conduit, said valves being operable in the reverse direction by a single movement to cut off said pump and reestablish each of said independent circuits.

5. The combination with a fluid system, comprising a plurality of normally independent circuits, of means for simultaneously testing all of said circuits and means for reestablishing said normally independent circuits through said testing means upon the conclusion of the testing operation, said testing means being common to all of said circuits.

In witness whereof I have hereunto set my hand in the presence of two subscribing witnesses this 7th day of May, 1913.

JOHN W. WHITE.

Witnesses:
 IRENE M. MULCAY,
 P. FRANK SONNEK.